(No Model.) 5 Sheets—Sheet 2.
H. W. HAND.
CONDENSER, DISTILLER, AND FEED WATER HEATER.
No. 596,874. Patented Jan. 4, 1898.
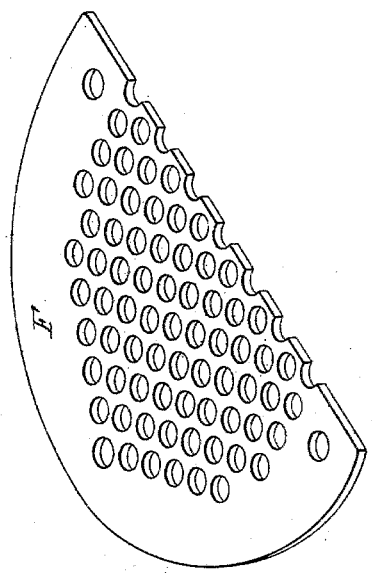
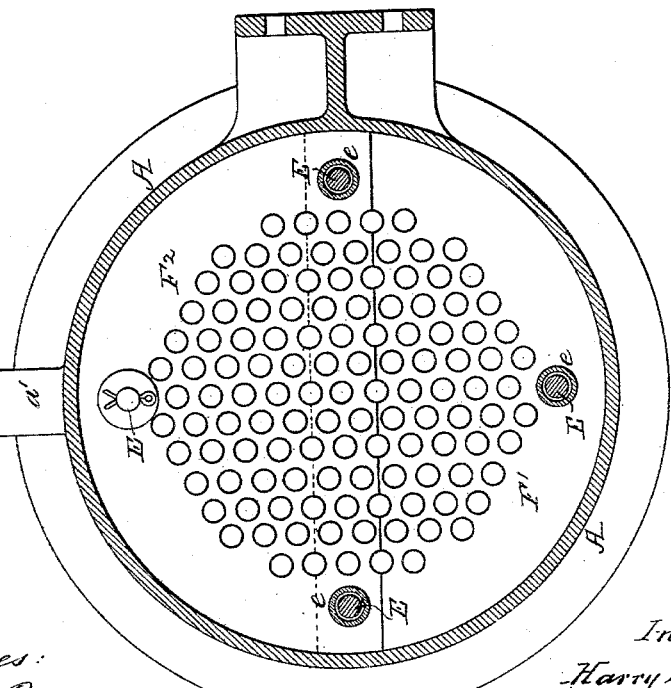
Witnesses:
Will. A. Barr.
Hamilton D. Turner
Inventor:
Harry W. Hand
by his Attorneys
Howson & Howson (No Model.) 5 Sheets—Sheet 3.
H. W. HAND.
CONDENSER, DISTILLER, AND FEED WATER HEATER.
No. 596,874. Patented Jan. 4, 1898.
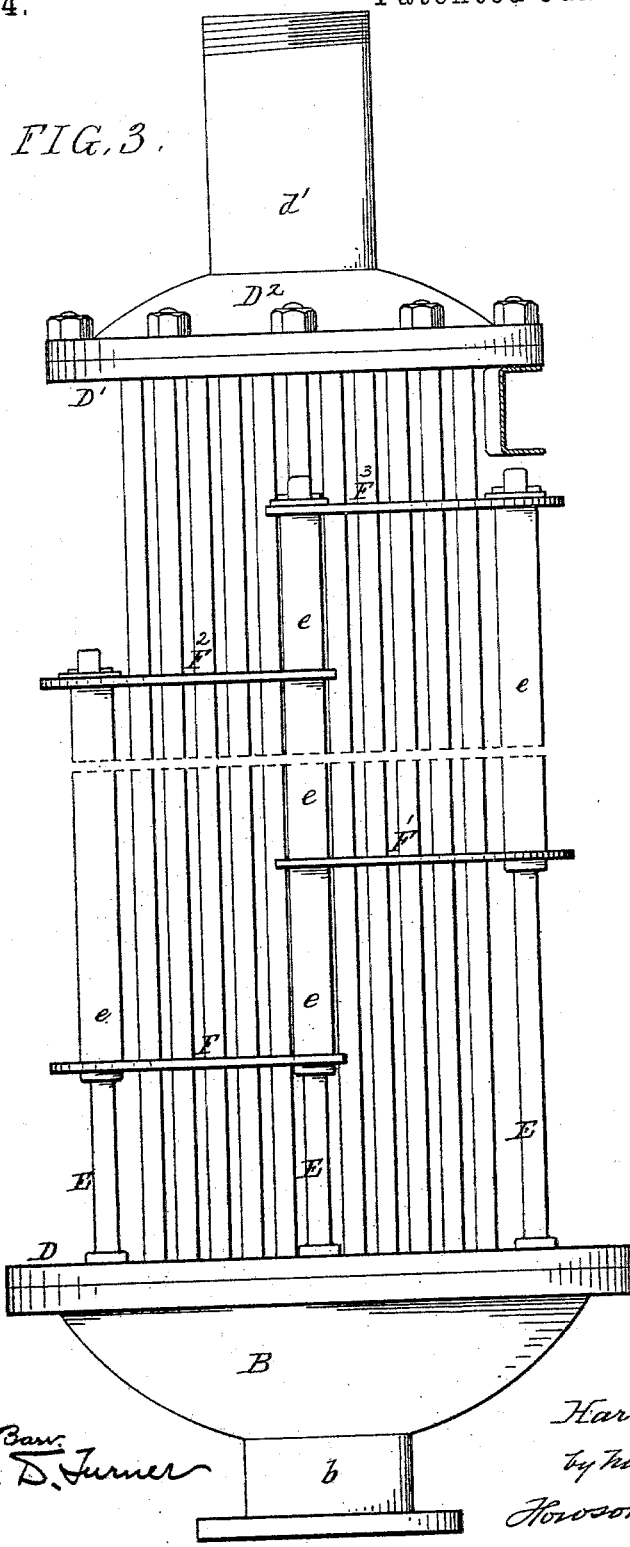

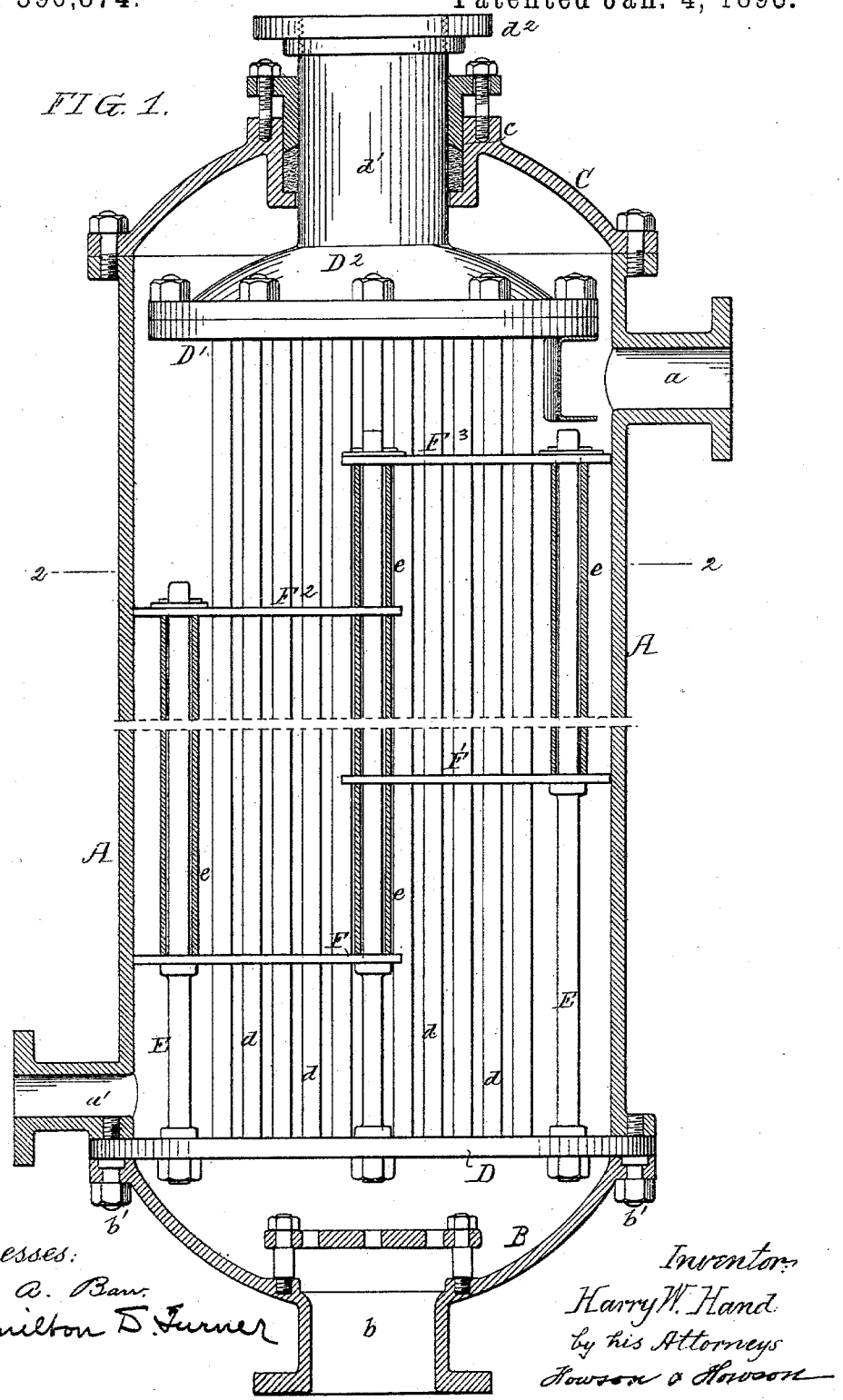

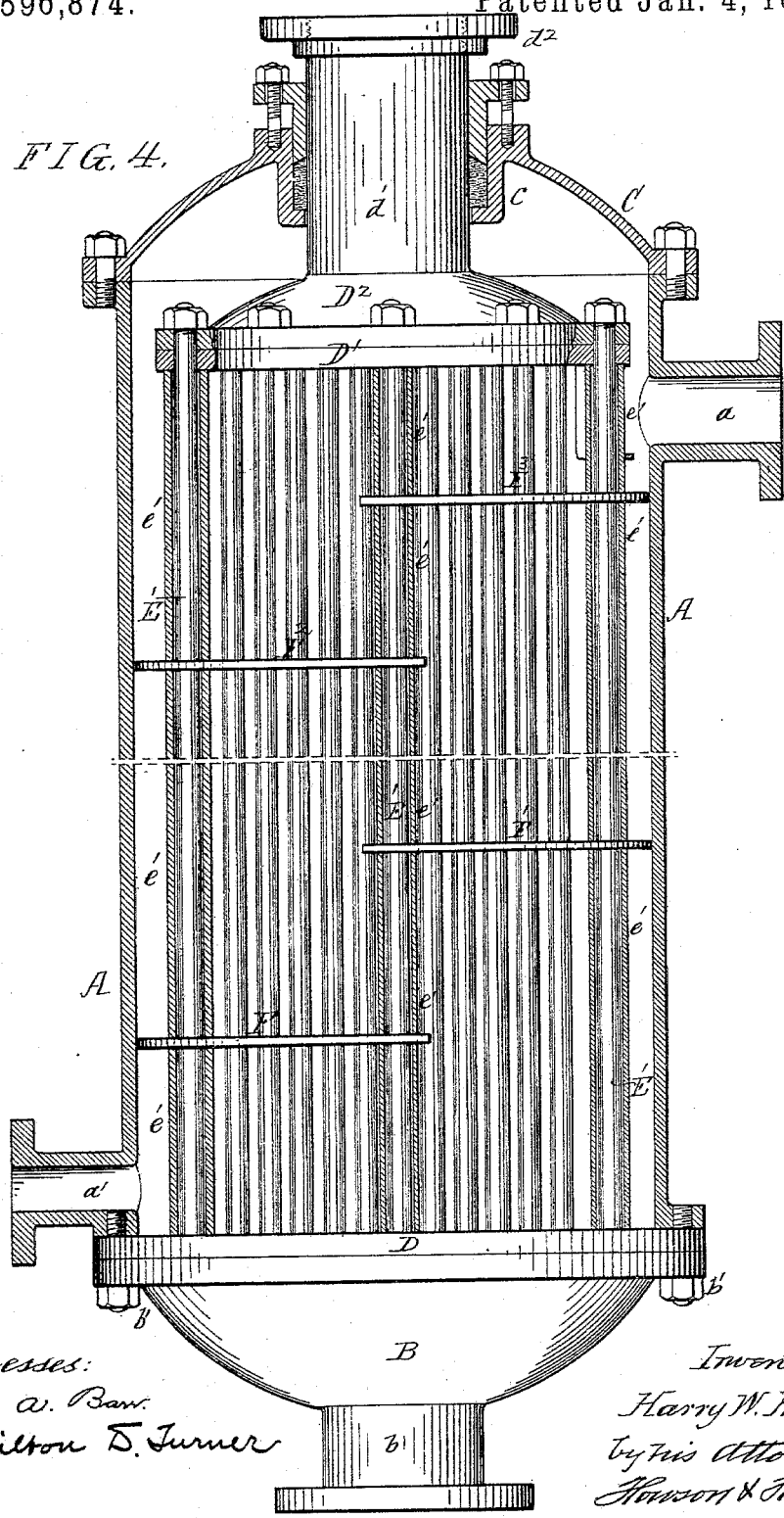

(No Model.)  5 Sheets—Sheet 5.

H. W. HAND.
CONDENSER, DISTILLER, AND FEED WATER HEATER.

No. 596,874. Patented Jan. 4, 1898.

Witnesses
Will. A. Barr.
Hamilton D. Turner

Inventor
Harry W. Hand
by his Attorneys
Howson & Howson

UNITED STATES PATENT OFFICE.

HARRY W. HAND, OF PHILADELPHIA, PENNSYLVANIA, ASSIGNOR TO THE WILLIAMSON BROTHERS COMPANY, OF SAME PLACE.

CONDENSER, DISTILLER, AND FEED-WATER HEATER.

SPECIFICATION forming part of Letters Patent No. 596,874, dated January 4, 1898.

Application filed May 1, 1897. Serial No. 634,711. (No model.)

*To all whom it may concern:*

Be it known that I, HARRY W. HAND, a citizen of the United States, residing in Philadelphia, Pennsylvania, have invented certain Improvements in Condensers, Distillers, and Feed-Water Heaters, of which the following is a specification.

My invention relates to certain improvements in condensers, distillers, and feed-water heaters.

The object of my invention is to place baffle-plates within the structure in such a manner that they can be readily withdrawn with the tubes when it is necessary to cleanse or repair the structure. This object I attain in the following manner, reference being had to the accompanying drawings, in which—

Figure 6:
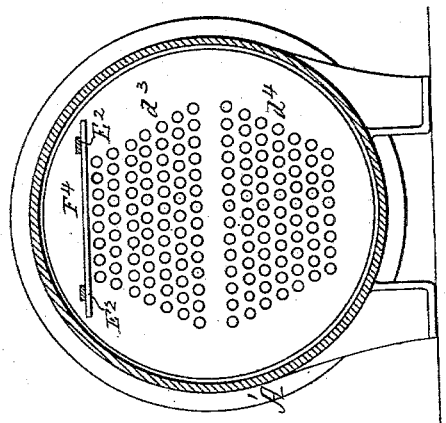
Figure 5:
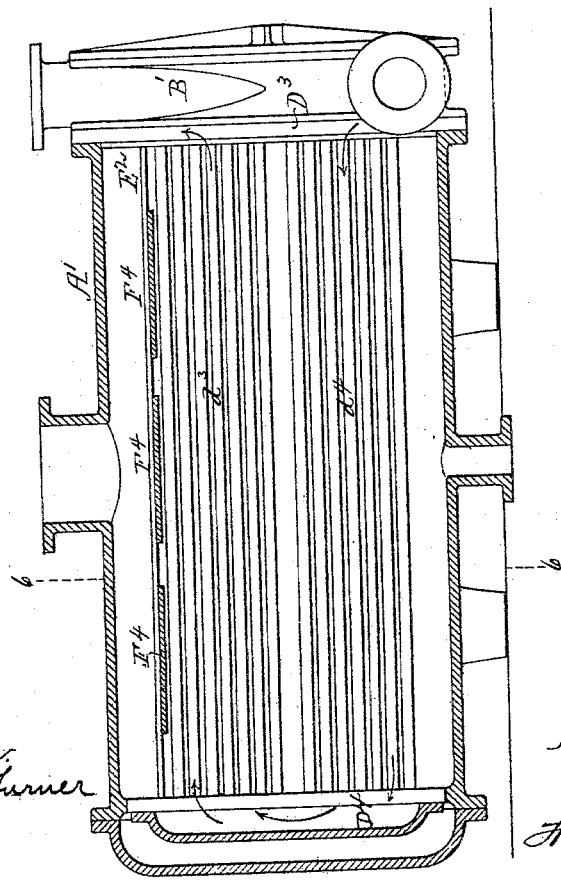

Figure 1 is a vertical sectional view of a water-distilling apparatus, illustrating my invention. Fig. 2 is a section on the line 2 2, Fig. 1. Fig. 3 is a view showing the tube structure withdrawn. Fig. 4 is a sectional elevation of a water-distilling apparatus, showing different means of attaching the baffle-plates to the removable structure. Fig. 5 is a longitudinal sectional view of a surface condenser, showing the deflecting or baffle plates attached to the removable portion of the structure. Fig. 6 is a section on the line 6 6, Fig. 5; and Fig. 7 is a detached perspective view of one of the baffle-plates shown in Fig. 1.

It has been the common practice to make structures of the type shown in the drawings without baffle-plates, owing to the difficulty in arranging the plates within the inclosing cylinder without interfering with the ready removal of the tubes when repairs are necessary.

By the arrangements shown in the drawings I may make a distiller, condenser, or feed-water heater with baffle-plates arranged as desired and in such a manner that they can be readily removed with the tubes.

Referring in the first instance to Figs. 1, 2, and 3, which represent a water-distilling apparatus, A is a shell or cylinder having a steam-inlet $a$ and a steam-outlet $a'$. B is a removable base having a central opening $b$, and between this base and the cylinder is a tube-plate D, to which the tubes $d$ $d$ are adapted. The tube-plate D and the base B are attached to the cylinder by bolts and nuts $b'$. The tubes $d$ extend nearly the full length of the cylinder A and are mounted in a tube-plate D' at the upper end, and above this tube-plate D' is a cap $D^2$, having a tubular extension $d'$, which passes through a stuffing-box $c$ in a bonnet C, secured to the upper end of the shell or cylinder A. The extension $d'$ has a removable flange $d^2$, which is screwed onto the threaded portion of the extension. The water passes through the tubes, while the steam passes through the cylinder and around the tubes.

The water-distilling apparatus described is adapted to be secured on one of the bulkheads of a vessel, and the pipes are so coupled that the salt water passes through the tubes $d$ and condenses the steam as it passes through the cylinder or shell A. In order that the steam may properly circulate within the cylinder, I mount on suitable standards E, there being four in the present instance, deflecting-plates F, F', $F^2$, and $F^3$. These plates are in the form of the segment of a circle, and each plate extends past the middle of the cylinder, so that they will overlap. The steam must take a circuitous passage from the inlet to the outlet. The plates are perforated, so as to allow for the passage of the tubes, and each plate is held in position by three standards. The standards E are secured in any suitable manner to the tube-plate D and, as shown in the drawings, are shouldered so that the bottom plates will rest thereupon. On the standards E, between the several plates, are sleeve $e$, so that the entire structure can be held rigidly by the cotters or other fastenings.

It will be seen that the plates are not attached to the cylinder, but are carried solely by the removable section of the apparatus. When it is wished to remove the tubes and the plates, all that is necessary is to remove the nuts $b'$ and the flange $d^2$ and loosen the stuffing-box, when the entire structure shown in Fig. 3 can be withdrawn from the cylinder for the purpose of cleansing or for repairs.

In some instances the standards may be in the form of bolts E', extending from one tube-plate to the other and acting as an additional means for staying the inner structure of tubes. The baffle-plates are mounted upon these tie-rods and are spaced by sleeves e' of a suitable length, so as to hold the baffle-plates rigidly in position.

It will be understood that while I have shown the cylinder arranged on end it may rest upon its side or mounted on suitable legs or standards.

Another form of apparatus is shown in Figs. 5 and 6—that is, a surface condenser in which only a series of deflecting-plates are used in the upper portion of the cylinder. These deflecting-plates $F^4$ are secured to rods $E^2$, extending from one tube-plate $D^3$ to the other tube-plate $D^4$. The tube structure is secured to the casing A' and head B', as shown, so that when the tubes are removed the deflecting-plates are also removed. It will thus be seen that any number of plates can be mounted in the manner described above without interfering with the ready removal of the tube structure and without complicating the apparatus.

I claim as my invention—

1. The combination in an apparatus for condensing, distilling or heating feed-water, of a casing, a series of tubes, and tube-plates so arranged as to be detachable from the casing and forming a removable tube structure, with deflecting-plates carried by the removable tube structure, substantially as described.

2. The combination of the casing, a tube-plate, tubes extending therefrom, a tube-plate less in diameter than the casing to which the opposite ends of the tubes are secured, so that the tube structure can be withdrawn from the casing, standards on one plate, plates carried by said standards and suitably spaced thereon, substantially as described.

3. The combination of the casing, a detachable tube structure, standards mounted on said structure, baffle-plates suitably spaced and mounted on the standards, sleeves between the baffle-plates and means for attaching the baffle-plates and sleeves to the standards, substantially as described.

4. The combination of the casing, a removable tube structure, a series of semicircular perforated baffle-plates through which the tubes pass, each of the baffle-plates extending beyond the center of the structure, means for securing the baffle-plates to the structure, a steam-inlet at one end of the casing and an outlet at the other end, substantially as described.

In testimony whereof I have signed my name to this specification in the presence of two subscribing witnesses.

HARRY W. HAND.

Witnesses:
  WILL. A. BARR,
  JOS. H. KLEIN.